Figure 1:
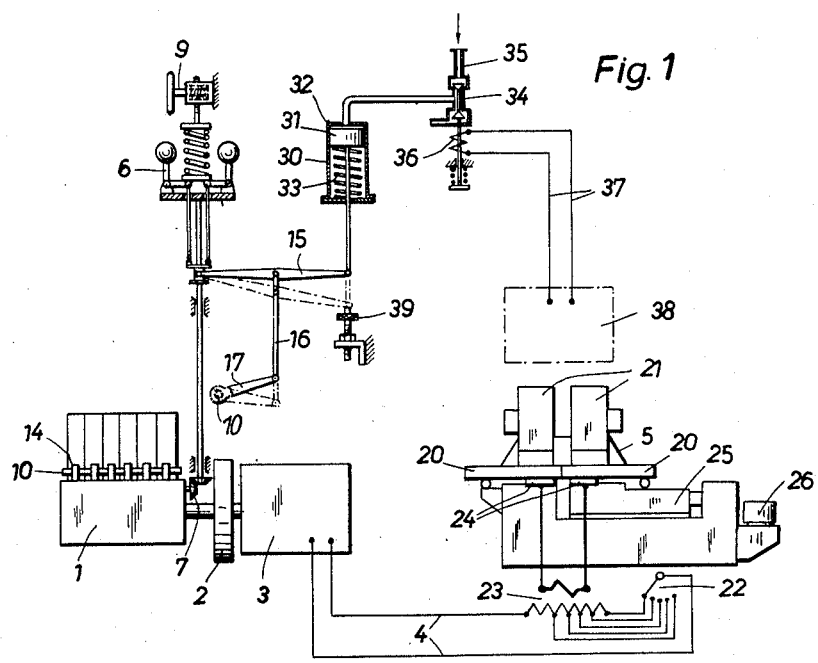

Aug. 12, 1958  R. FEISS  2,847,582
INTERNAL COMBUSTION ENGINE POWER PLANT
Filed Aug. 15, 1955

INVENTOR:
RENÉ FEISS

BY Wenderoth, Lind & Ponack
Attys.

United States Patent Office 2,847,582
Patented Aug. 12, 1958

2,847,582
INTERNAL COMBUSTION ENGINE POWER PLANT

René Feiss, Winterthur, Switzerland, assignor to Schweizerische Lokomotiv- und Maschinenfabrik, Winterthur, Switzerland Application August 15, 1955, Serial No. 528,372

Claims priority, application Switzerland, August 19, 1954

4 Claims. (Cl. 290—40)

The present invention relates to internal combustion engine power plants of the type having a generator which supplies electric current or a stream of pressure gas or pressure liquid to at least one place of consumption and which plant is subjected to sudden and considerable changes of load, regulating member of the fuel pumps of the engine being under the control of a governor.

In plants of this kind the fuel supply is usually varied according to the changes in speed of the engine coupled to the generator. When the engine is subjected e. g. to an increase in load resulting from the network, its speed continuously decreases until the governor has adjusted the regulating member of the fuel pumps by such an amount that the fuel delivery will correspond to the change in load. In this case, as is generally known, delays of the regulating process and variations in speed will occur, which delays increase, on the one hand, the more the increase in load is rapid and pronounced and on the other hand, the greater is the degree of irregularity of the governor and the smaller is the flywheel mass coupled to the generator.

However, for certain types of current consumption plants, for instance for electric butt welding machines, such requirements are imposed on constant frequency of the terminal voltage and on maintaining the sine-form of the voltage curve and thus on maintaining the speed of the current generator, which can hardly be met anymore by known means. While it is true that governors having a small degree of irregularity could be employed, such governors show a tendency for undesired oscillations, especially at a low load of the motor. Furthermore, the speed drop at a great increase in load could be counteracted by the use of an excessively great flywheel. However, in most cases this solution is not sufficient and, moreover, not desired in many applications, such as e. g. for movable power plants, on account of the increased weight.

It is an object of the invention to minimize the drop and the variation in speed caused by sudden increases of load, while avoiding the above mentioned disadvantages. According to the invention provision is made in an internal combustion engine power plant of the described type, of an additional adjusting device cooperating with the governor movement transmission means for preregulation of the fuel pump regulating member, said adjusting device being connected to the point of current consumption by means of a control line adapted to transmit impulses from said place of consumption for actuating the regulating member of the fuel pump.

The arrangement according to the invention enables to increase the fuel supply to the engine already at the moment a sudden increase in load arises, substantially in proportion to the intensity of the increase of load. A speed drop of the engine can then occur only to an insignificant degree.

Figure 2:
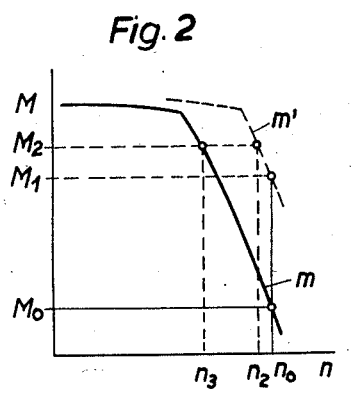
Figure 3:
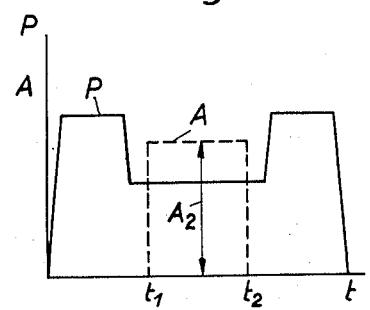

The present invention will now be described in more detail with reference to the accompanying drawings illustrating by way of example a preferred embodiment of the invention, and in which:

Fig. 1 is a diagrammatic view of an internal combustion engine power plant,
Fig. 2 is a diagram showing torque-characteristics, and
Fig. 3 shows the diagram of a welding program.

The diesel engine 1 of the power plant diagrammatically shown in Fig. 1 drives an alternating current generator 3 by a normally dimensioned flywheel 2. The electric current produced by said generator is supplied over the network 4 to the place of consumption which by way of example is represented by a butt welding machine 5.

Provided on the diesel engine 1 is a centrifugal governor 6 having a normal degree of irregularity and which is driven by the engine shaft over bevel gears 7 and associated with a speed adjusting device 9. The governor automatically controls the setting of the regulating shaft 10 of the fuel pumps 14 according to the respective load by means of the transmission lever 15, the rod 16 and the lever 17 keyed to the regulating shaft. The torque characteristic of the governor is shown in Fig. 2 by the curve indicated in full line.

The workpieces 20 e. g. rods to be welded together are firmly held on the butt welding machine 5 by means of clamping blocks 21 actuated by compressed air. Electric current is supplied from the low tension side of a transformer 23 provided with a step regulator 22, through water-cooled gripping jaws 24. In operating the welding machine, the inner ends of the rods 20 are first preheated, then burnt off and subsequently upset by the movement of the sliding upsetting die 25. The latter, for this purpose is provided with a relay-controlled drive 26.

The sequence of the various operations occurs automatically according to a precisely prescribed welding program dependent on the material to be welded and on the cross-sectional size of same. Such a welding program is illustrated in Fig. 3 by way of example, wherein P represents the contact pressure to be exerted on the ends of the workpiece and A the intensity of the welding current as a function of the time $t$. According to this program, a great contact pressure is required before and after the actual welding operation, while during welding a lower contact pressure only is necessary.

In order to be able to meet the sudden increases in current and to maintain the time intervals as precisely as possible, and with a minimum of fluctuations, thus, to minimize the speed drop of the driving motor and generator, a special adjusting device is built into the governor adjusting means provided on the motor 1. This device permits of an advance regulating of the fuel pump-control member, which is superposed to the normal effect of the governor 6. The adjusting device essentially consists of a cylinder 30 the piston 31 of which is connected to the right-hand end of the transmission lever 15, and the cylinder space 32 of which communicates with the compressed air duct 35 by means of the electrically actuated valve 34. The solenoid 36 of the valve 34 is connected to the control apparatus 38 of the welding machine 5 by an electric line 37, and is automatically supplied with voltage from said apparatus.

In operation, compressed air from the duct 35 enters the cylinder space 32 and, against the pressure of the spring 33, forces the piston 31 in downward direction until the right-hand end of the transmission lever 15 strikes against the adjustable stop 39, whereby the levers 15 and 17 will occupy the position indicated in dot and dashlines and the regulating shaft 10 will adjust the fuel pumps 14 for increased output.

This operation is initiated for instance at the time $t_1$ of the welding program illustrated in Fig. 3, since the welding current has then to increase almost suddenly to the current intensity $A_2$. The corresponding change is indicated in Fig. 2 by the dash-line curve $m'$, since the magnitude of the torque delivered by the motor 1 increases at momentarily constant speed $n_0$ from the idle running value $M_0$ to the value $M_1$, corresponding to the required current intensity $A_2$ of the welding program interval situated between the time $t_1$ and $t_2$. The governor 6 will then have to readjust only the small torque difference $(M_2-M_1)$ so that also the motor speed will only drop by a small amount, namely $(n_0-n_2)$.

If the governor movement transmission members had not been preregulated by the adjusting device in the described manner, the regulating process would then take place along the normal characteristic curve $m$ and the speed would thus drop to the value $n_3$ after termination of the oscillations during the regulating process. A longer lasting regulation time, as a further undesired fact, thus would in this case also be added to the greater drop in speed.

In place of a purely mechanically operating regulating linkage, one having servo-control e. g. of hydraulic, electric or electronic type, could also be used and the adjusting device correspondingly formed.

What I claim is:

1. In combination with an internal combustion engine having a variable feed fuel pump, a generator driven by said engine, a current consumer connected with said generator, fuel delivery adjusting means for said pump, an engine speed governor, movement transmission means between said governor and said fuel delivery adjusting means, a control device for said fuel delivery adjusting means, a winding connected to said consumer and operating said control device responsive to changes of load of said consumer, means operatively connecting said control device to said movement transmission means to independently transmit control movements either from said governor or from said control device to said fuel delivery adjusting means, means released upon actuation of said operating winding to impart a sudden control movement to said fuel delivery adjusting means, and an adjustable movement limiting member for limiting the stroke imparted by said control device to said movement transmitting means.

2. An internal combustion engine plant for driving a producer of electrical power, which is subjected to heavy load peaks by a consumer, comprising a fuel feed pump for said engine, a fuel adjusting member for said fuel feed pump, a governor controlling said fuel adjusting member, an additional control device superposed to said governor also controlling said fuel adjusting member responsive to the load upon said consumer, an adjustable stop member, said additional control device, upon a load peak, being brought quickly into an end position set by said adjustable stop member so that said fuel adjusting member, while remaining responsive to said governor, is also brought quickly into a position corresponding to the new load.

3. An internal combustion engine plant as set forth in claim 2 wherein a lever is interposed between said governor and said fuel adjusting member and said additional control device also acts upon said lever.

4. An internal combustion engine plant as set forth in claim 3 wherein fluid pressure operates said additional control device in order to quickly bring said fuel adjusting member into a position corresponding to the new load placed upon said consumer.

References Cited in the file of this patent

UNITED STATES PATENTS

| | | |
|---|---|---|
| 1,709,689 | Staege | Apr. 16, 1929 |
| 2,150,294 | Roosa et al. | Mar. 14, 1939 |
| 2,203,717 | Blankenbuehler | June 11, 1940 |
| 2,242,072 | Holslag | May 13, 1941 |
| 2,424,121 | Schlapfer | July 15, 1947 |
| 2,799,783 | McFarland | July 16, 1957 |

UNITED STATES PATENT OFFICE

CERTIFICATE OF CORRECTION

Patent No. 2,847,582 August 12, 1958

Rene Feiss

It is hereby certified that error appears in the above numbered patent requiring correction and that the said Letters Patent should read as corrected below.

In the heading to the printed specification, line 7, foreign filing date, for "August 19, 1954" read -- August 14, 1954 --.

Signed and sealed this 27th day of January 1959.

(SEAL)
Attest:

KARL H. AXLINE

Attesting Officer

ROBERT C. WATSON
Commissioner of Patents